United States Patent
Gum et al.

(10) Patent No.: US 10,452,212 B2
(45) Date of Patent: Oct. 22, 2019

(54) MITIGATING ACTIVE STYLUS/TOUCH CROSS-COUPLING

(71) Applicant: Apple Inc., Cupertino, CA (US)

(72) Inventors: Leah Gum, San Francisco, CA (US); Wayne C. Westerman, Burlingame, CA (US); Seyed Mohammad Navidpour, San Jose, CA (US); Shahrooz Shahparnia, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 249 days.

(21) Appl. No.: 15/485,698

(22) Filed: Apr. 12, 2017

(65) Prior Publication Data

US 2017/0293372 A1    Oct. 12, 2017

Related U.S. Application Data

(60) Provisional application No. 62/321,549, filed on Apr. 12, 2016.

(51) Int. Cl.
*G06F 3/044* (2006.01)

(52) U.S. Cl.
CPC .... *G06F 3/044* (2013.01); *G06F 2203/04104* (2013.01)

(58) Field of Classification Search
CPC .... G06F 3/03545; G06F 3/044; G06F 3/0383; G06F 2203/04104
See application file for complete search history.

(56) References Cited

U.S. PATENT DOCUMENTS

2009/0267916 A1* 10/2009 Hotelling ............... G06F 3/044
                                                             345/174
2011/0175823 A1*  7/2011 Vieta .................... G06F 3/0412
                                                             345/173

* cited by examiner

*Primary Examiner* — Shaheda A Abdin
(74) *Attorney, Agent, or Firm* — DLA Piper LLP US (57) ABSTRACT

In one aspect, the present disclosure relates to a method including determining which sense lines are potentially corrupted based on touch image information, measuring a sense signal on each sense line, and applying a trained best compensation factor to the measured sense signal on potentially corrupted sense lines in order to produce a corrected sense signal. The corrected sense signal eliminates active stylus signal that has cross-coupled to a touch contact (e.g., a finger or conductive stylus) and thereby mitigates errors in stylus location due to cross-coupled signal.

21 Claims, 10 Drawing Sheets

MITIGATING ACTIVE STYLUS/TOUCH CROSS-COUPLING

CROSS-REFERENCE TO RELATED APPLICATION

This application claims priority to and the benefit of U.S. Provisional Patent Application No. 62/321,549 filed on Apr. 12, 2016, the disclosure of which is incorporated herein by reference in its entirety.

FIELD OF THE DISCLOSURE

The present disclosure relates generally to touch screen devices compatible with active styluses.

BACKGROUND

Many types of input devices may be used to provide input to computing devices, such as buttons or keys, mice, trackballs, joysticks, touch screens and the like. Touch screens, in particular, are becoming increasingly popular because of their ease and versatility of operation. Typically touch screens can include a touch sensor panel, which may be a clear panel with a touch-sensitive surface, and a display device that can be positioned behind the panel so that the touch-sensitive surface substantially covers the viewable area of the display device. Touch screens allow a user to provide various types of input to the computing device by touching the touch sensor panel using a finger, stylus, or other object at a location dictated by a user interface being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event. More advanced touch screens are capable of detecting multiple touches simultaneously. In general, touch screens can recognize the position of the one or more touches on the touch sensor panel, and a computing system can then interpret the touches, either individually or as a single gesture in accordance with the display appearing at the time of the touch event, and thereafter can perform one or more actions based on the touch event.

Touch sensor panels can be formed from a matrix of row and column traces, with sensors or pixels present where the rows and columns cross over each other while being separated by a dielectric material. Each row can be driven by a stimulation signal, and touch locations can be identified through changes in the stimulation signal. Typically, a touch location is sensed based on an interference of the stimulation signal, such that a touch location may correspond to a location where the stimulation signal is the weakest. Touch sensor panels may generally be configured to detect touches from a user's fingers, which generally have a surface area that contacts the touch sensor panel to disturb the stimulation signal sufficiently for touch location to be recognized.

When a stylus has been used as an input device in a capacitive touch system, the stylus has traditionally been finger-like in nature. A conventional stylus is often simply a conductive rod with a finger-sized rounded tip large enough to disrupt the electric field lines between the drive and sense electrodes of a capacitive touch sensor panel. As such, conventional styluses are passive input devices in that they are incapable of actively transmitting stimulus signals or sensing a touch-induced capacitance change in a capacitive touch sensor panel.

Another type of stylus, the active stylus disclosed in U.S. Pat. No. 8,928,635, incorporated herein in its entirety, acts as a drive and/or a sense element in a capacitive touch system. Unlike conventional styluses which work passively by blocking electric field lines between the drive and sense electrodes of a capacitive touch sensor panel, active styluses can either act as a drive electrode to create an electric field between the drive electrode and the sense lines of a mutual capacitive touch sensor panel, or as a sense electrode for sensing capacitively coupled signals from one or more stimulated drive rows and columns of the touch sensor panel or both. These styluses can be referred to as active styluses in comparison to conventional passive styluses. These active styluses can significantly improve stylus sensing on a mutual capacitive touch sensor panel without incurring significant additional cost.

If the active stylus is a drive-type active stylus, it operates to create an oscillating electric field that is sensed by the sense lines of the capacitive touch sensor panel. However, if the user is simultaneously using the stylus and touching the touch sensor panel, the drive electric field may cross-couple, resulting in a portion of the stylus drive signal being detected at the touch location. The amount of stylus drive signal cross-coupled depends in part on the user's level of grounding. If the stylus position and the touch position are aligned along a touch sensor panel row or a touch sensor panel column, this cross-coupling can result in an error in the determined stylus position due to constructive/destructive interference between the stylus drive signal at the stylus location and the stylus drive signal cross-coupled onto the same row or column sense line at the touch location.

SUMMARY

Embodiments of the present disclosure include a method for mitigating cross-coupling in an active stylus device, including determining which sense lines of a plurality of sense lines are potentially corrupted based on touch image information, measuring a sense signal on each of the plurality of sense lines, applying a trained best compensation factor to the measured sense signal on each sense line that has been determined to be potentially corrupted to produce a corrected sense signal for each such sense line, and determining a stylus location based on the corrected sense signals.

In some embodiments, the method also includes training the trained best compensation factor. In one such embodiment, the training is performed during a LCD module (LCM) blanking interval of a touch screen display.

In one embodiment, training the trained best compensation factor includes marking a plurality of sense lines as training pixels based on touch image information and a negative phase of the active stylus signal, measuring a training sense signal on each of the plurality of sense lines marked as training pixels, calculating a plurality of compensation factors, wherein each compensation factor is the best compensation factor for one of the marked sense lines, and computing the trained best compensation factor from the plurality of compensation factors. In one such embodiment, the compensation factors are calculated in the I/Q domain. In another such embodiment, the compensation factors are calculated such that when the dot product of the compensation factor and the touch image information for the marked sense line is subtracted from the measured training sense signal on the marked sense line, the result is zero. In another such embodiment, the computation is done using a least squares method. In another such embodiment, a line is marked as a training pixel when the touch image information and the measured training sense signal show that the negative phase of the active stylus signal is present on the line and a touch contact is present on the line.

In one embodiment, the trained best compensation factor is composed of a magnitude portion and a phase portion. In one embodiment, the corrected sense signal for each potentially corrupted sense line is equal to the difference between the measured sense signal for that line and the dot product of the trained best compensation factor and the touch image information for that line. In one embodiment, the method is performed for multiple stylus drive signals. In a further embodiment, the multiple stylus drive signals comprises a ring drive signal and a tip drive signal.

Embodiments of the present disclosure also include a touch-screen device supporting an active stylus, including a touch-screen display comprising a touch sensor with a plurality of sense lines, a memory storing program instructions, and a processor coupled to the memory, wherein the processor is configured to execute the program instructions to determine which sense lines of the plurality of sense lines are potentially corrupted based on touch image information determined by the touch sensor, measure a sense signal on each of the plurality of sense lines, apply a trained best compensation factor to the measured sense signal on each sense line that has been determined to be potentially corrupted to produce a corrected sense signal for each such sense line, and determine a stylus location based on the corrected sense signals.

In one embodiment, the plurality of sense lines comprises a plurality of row sense lines and a plurality of column sense lines. In one embodiment, the processor is further configured to execute the program instructions to train the trained best compensation factor. In one embodiment, the training is performed during a LCM blanking interval of the touch screen display. In one embodiment, the processor is further configured to execute the program instructions to train the trained best compensation factor by marking a plurality of sense lines as training pixels based on touch image information and a negative phase of the active stylus signal, measuring a training sense signal on each of the plurality of sense lines marked as training pixels, calculating a plurality of compensation factors, wherein each compensation factor is the best compensation factor for one of the marked sense lines, and computing the trained best compensation factor from the plurality of compensation factors. In one embodiment, the stylus location is determined while the touch screen display is refreshed.

Another embodiment of the present disclosure includes a non-transitory computer readable medium containing program instructions which, when executed by a hardware processor of a touch screen device, configure the processor to determine which sense lines of a plurality of sense lines coupled to the processor are potentially corrupted based on touch image information determined by a touch sensor, measure a sense signal on each of the plurality of sense lines, apply a trained best compensation factor to the measured sense signal on each sense line that has been determined to be potentially corrupted to produce a corrected sense signal for each such sense line, and determine a stylus location based on the corrected sense signals.

In one embodiment, the processor is further configured to train the trained best compensation factor, where training the trained best compensation factor includes marking a plurality of sense lines as training pixels based on touch image information and a negative phase of the active stylus signal, measuring a training sense signal on each of the plurality of sense lines marked as training pixels, calculating a plurality of compensation factors, wherein each compensation factor is the best compensation factor for one of the marked sense lines, and computing the trained best compensation factor from the plurality of compensation factors.

Other features and advantages will become apparent from the following detailed description and drawings.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

The present disclosure describes a touch-screen device that mitigates cross-coupling between a drive-type active stylus and touch contacts on the touch sensor panel.

In the present disclosure, a method and system is described in which certain touch screen sensor components are identified as training components during a screen blanking interval. The identification is done based on touch image information and a negative phase of the active stylus drive signal. Signal at the training components is measured and used to derive a best compensation factor, and the compensation factor is used during a non-blanking interval to correct the sensed stylus signal.

Figure 1:
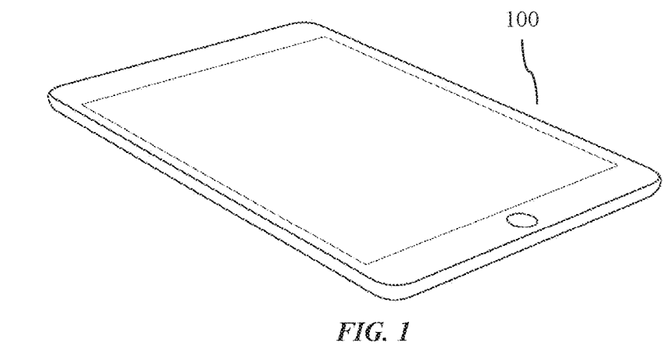
FIG. 1 shows a touch screen device in accordance with an embodiment of the present disclosure.

FIG. 1 shows an example of a touch screen device 100, such as a smartphone or tablet, as described in more detail herein. The touch screen device 100 may include one or more touch sensors, including a plurality of sense rows and columns for sensing touch contacts and/or stylus contacts.

Figure 2:
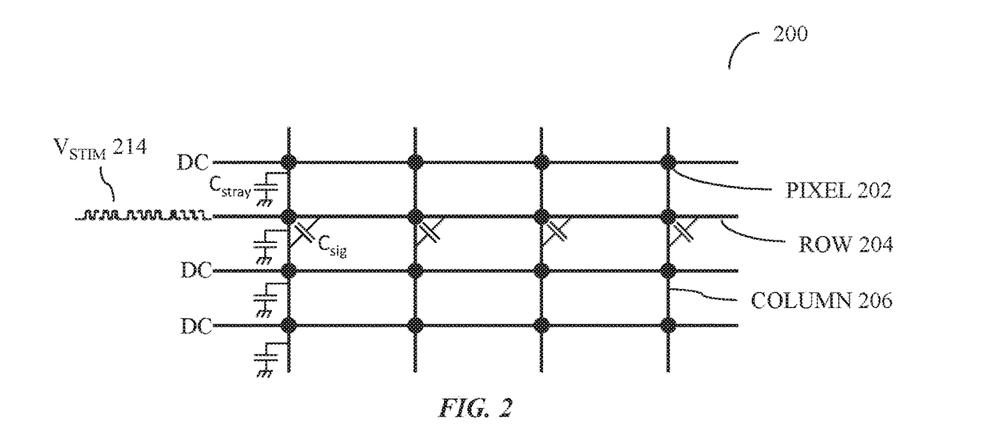
FIG. 2 shows the underlying structure of an exemplary capacitive touch sensor panel.

FIG. 2 shows the underlying structure of an exemplary capacitive touch sensor panel 200. Capacitive touch sensor panels are well known in the art and have been widely adopted in various types of electronic devices, such as tablet PCs (e.g., the iPad® from Apple Inc. of Cupertino, Calif.) and smartphones (e.g., the iPhone® from Apple Inc. of Cupertino, Calif.). One exemplary type of capacitive touch sensor panel include a mutual capacitive touch sensor panel formed from drive and sense lines (e.g., rows and columns of traces) on opposite sides of a dielectric, or adjacent to each other on the same side of a substrate. At the "intersections" of the traces, where the traces pass above and below or are adjacent to each other (but do not make direct electrical contact with each other), the traces essentially form two electrodes. In one embodiment, touch sensor panels for use over display devices may utilize a top layer of glass upon which transparent column traces of indium tin oxide (ITO) or antimony tin oxide (ATO) have been etched, and a bottom layer of glass upon which row traces of ITO have been etched. The top and bottom glass layers can be separated by a clear polymer spacer that acts as a dielectric between the row and column traces. Other touch sensor panel configurations, such as those with drive and sense lines on opposite sides of a substrate or on the same side of a substrate, and self-capacitance touch sensor panels are also contemplated for use with embodiments of the disclosure.

FIG. 2 indicates the presence of a mutual capacitance Csig at each pixel 202 located at the intersection of a row 204 and a column 206 trace (although Csig for only one column is illustrated in FIG. 2 for purposes of simplifying the figure). FIG. 2 also indicates the presence of a stray capacitance Cstray at each pixel 202 located at the intersection of a row 204 and a column 206 trace (although Cstray for only one column is illustrated in FIG. 2 for purposes of simplifying the figure). Note that although FIG. 2 illustrates rows 204 and columns 206 as being substantially perpendicular, they need not be so aligned. In the example of FIG. 2, AC stimulus Vstim 214 is being applied to one row, with all other rows connected to DC. The stimulus causes a charge to be injected into the column electrodes through mutual capacitance at the intersection points. Each of columns 206 may be selectively connectable to one or more analog channels.

Figure 3:
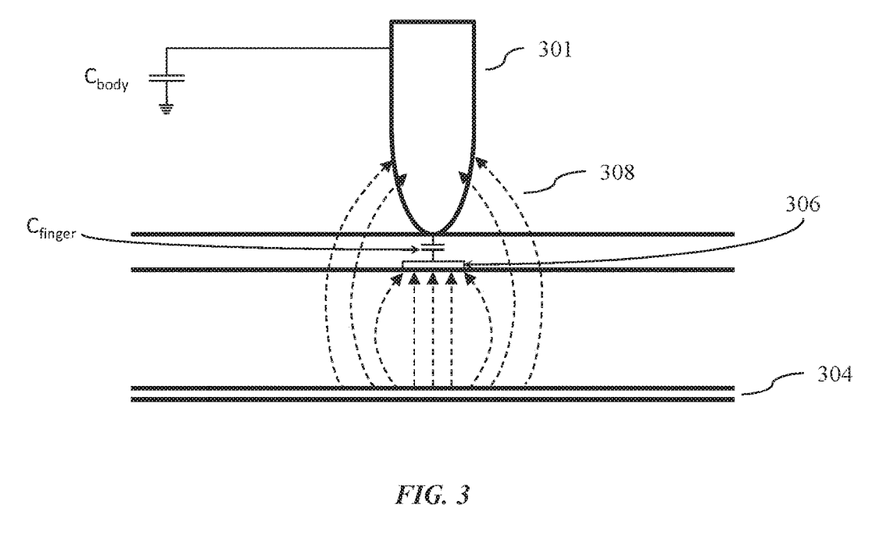
FIG. 3 shows the interaction between a finger and the touch sensor panel of FIG. 2.

FIG. 3 shows the interaction between a finger and the touch sensor panel of FIG. 2. In FIG. 3, a conductive object 301 has been placed on top of a touch screen display near pixel 202. As shown, the conductive object 301 can be a finger. However, it should be understood that the conductive object 301 can also be a finger or anything else that is conductive. The conductive object 301 can be a low-impedance object at signal frequencies, and can have a capacitance Cfinger from the column trace 306 to the object. The conductive object 301 can have a self-capacitance to ground Cbody that is much larger than Cfinger. If the conductive object 301 blocks some electric field lines 308 between the row electrodes 304 and column electrodes 306 (those fringing fields that exit a dielectric between the row and column layers and pass through the air above the row electrode), those electric field lines can be shunted to ground through the capacitive path inherent in the conductive object, and as a result, the steady state signal or mutual capacitance Csig can be reduced by ΔCsig (which can also be referred to herein as Csig_sense). In other words, the capacitance of the conductive object can act as a shunt or dynamic return path to ground, blocking some of the electric fields and resulting in a reduced net signal capacitance.

When the conductive object acts as a shunt to ground and blocks some of the electric field lines, the signal capacitance at the pixel becomes Csig−ΔCsig, where Csig represents the static (no touch) component and ΔCsig represents the dynamic (touch) component. This change in capacitance can be used to detect a touch at a particular location (e.g., pixel 202) of the touch sensor panel. Multiple touches can also be detected simultaneously on a touch sensor panel by determining whether there is a change in capacitance at each of the pixels of the touch sensor panel using the same method as discussed above.

Figure 4:
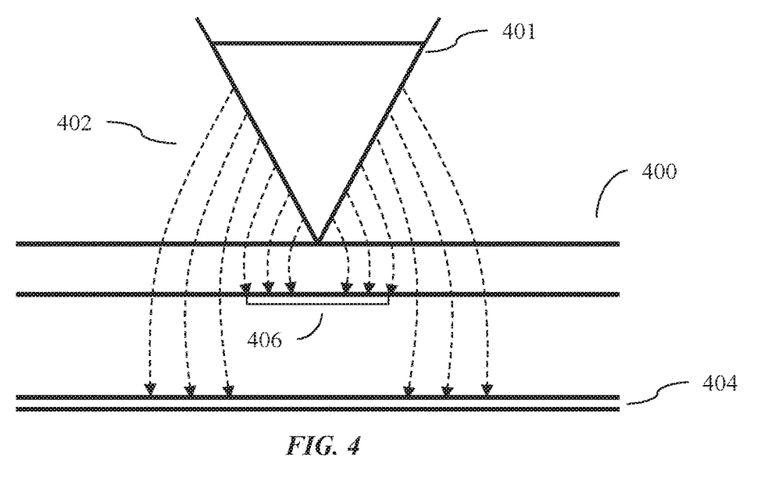
FIG. 4 shows the interaction between a drive-type active stylus and the touch sensor panel of FIG. 2.

FIG. 4 shows the interaction between a drive-type active stylus and the touch sensor panel of FIG. 2. In FIG. 4, when the stylus tip is in contact with (or in close proximity to) the capacitive touch sensor panel 400, the electrode 401 in the tip can be stimulated to actively generate electric field lines (collectively 402) and form a capacitive coupling with the sense row 404 and/or column 406 of the capacitive touch sensor panel 400. In other words, a capacitive path can be formed for coupling charge from the stylus 400 to the sense row 404 and column 406. The sense row 404 and column 406 can output signals representative of the charge coupling to sensing circuitry. Based on the row(s) and column(s) from which the signals are received, the location of the stylus touch can be determined.

While FIG. 4 illustrates a stylus employing a single tip electrode, drive-type active styluses compatible with embodiments of the present disclosure may incorporate multiple electrodes, as described in U.S. Pat. No. 8,638,320, incorporated herein in its entirety. For example, a stylus may include a tip and ring electrode, or a tip electrode and multiple strip electrodes.

Figure 5:
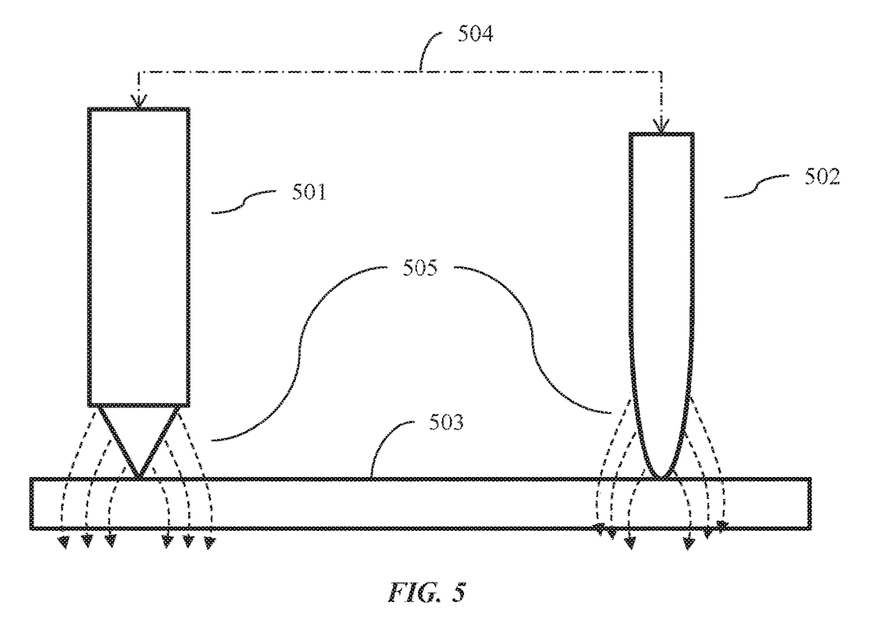
FIG. 5 shows an exemplary cross-coupling path between a drive-type active stylus and a finger placed on a touch sensor.

FIG. 5 shows an exemplary cross-coupling path between a drive-type active stylus 501 and a finger 502 placed on a touch sensor 503. In this situation, a conductive path 504 forms between the active stylus 501 and the stylus user's finger 502. The drive electric field 505 thus couples through and is produced at both locations. At touch sensor 503, the drive electric field couples into the sense column and row lines at both the location of active stylus 501 and the location of finger 502. This can result in constructive and/or destructive interference of the AC waveform of the stylus drive signal, resulting in errors in sensing the position of the stylus.

Figure 6A:
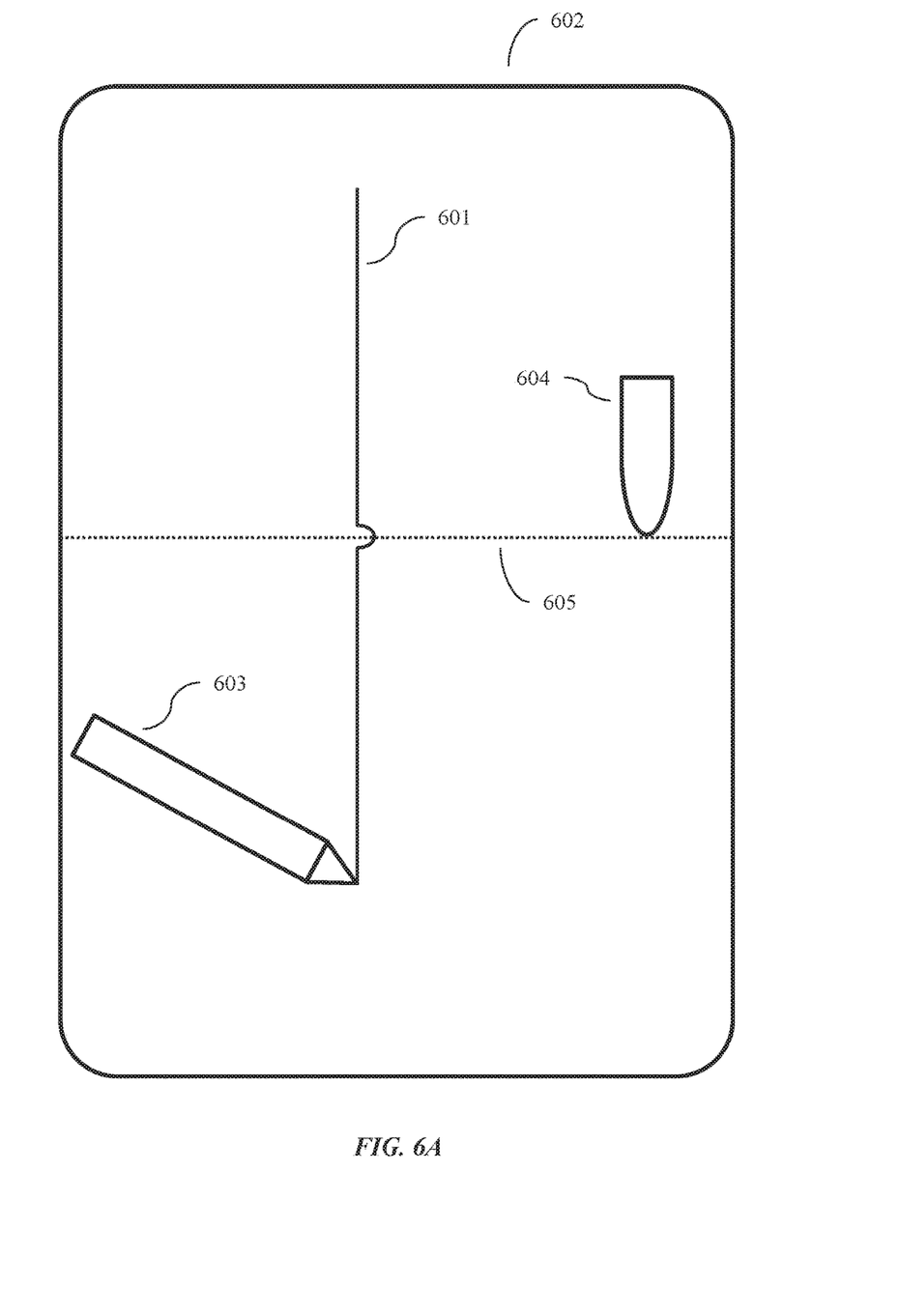
FIGS. 6A-6B illustrate exemplary results of cross-coupling when an active stylus is used with a system without cross-coupling mitigation.
Figure 6B:
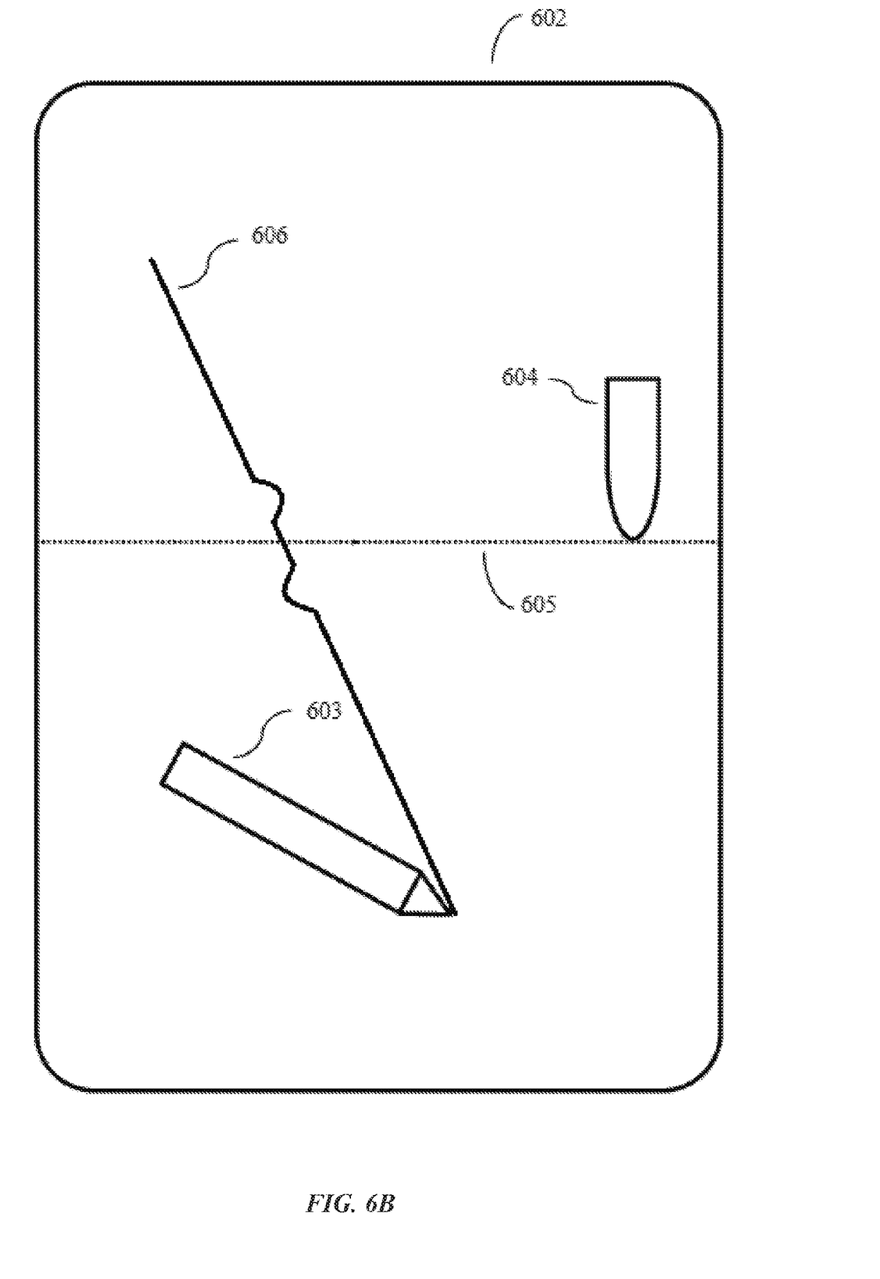

FIGS. 6A-6B illustrate exemplary results of cross-coupling when an active stylus is used with a system without cross-coupling mitigation. In FIG. 6A, the stylus user has attempted to draw a straight vertical line 601 from top to bottom of the touch screen 602 using stylus 603. However, the user has placed finger 604 on the touch screen, resulting in cross-coupling of the stylus signal. As the stylus tip 603 passes over the same sense row 605 as the sense row upon which the user's finger 604 is placed, the signals interfere, resulting in an error in detected position of the stylus. This error can be seen as a sideways jump in the line drawn by the stylus as the stylus crosses over the sense row the finger is placed upon. Similarly in FIG. 6B, the stylus user has attempted to draw a diagonal line 606, but the interference causes the line 606 to deviate.

Figure 7:
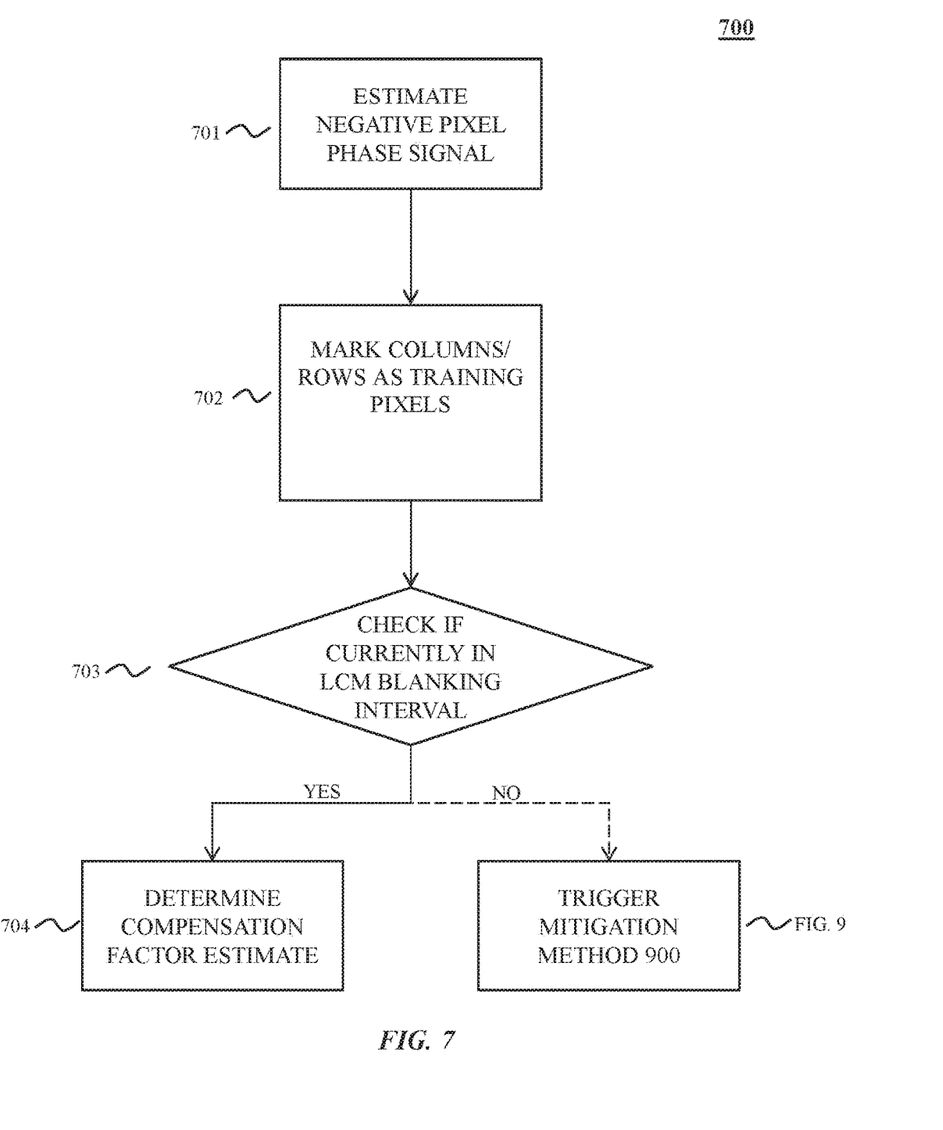
FIG. 7 illustrates a method of cross-coupling mitigation training according to some embodiments of the present disclosure.

FIG. 7 illustrates a method 700 of cross-coupling mitigation training according to some embodiments of the present disclosure. While FIG. 7 is described with respect to a single-axis implementation, it may be applied on a per-axis basis in systems which support styluses with multiple drive signals. In step 701, a negative pixel phase signal is estimated. The negative pixel phase signal is a signal with the opposite phase of the stylus AC drive signal.

In step 702, a number of columns/rows that comprise the stylus signal are marked as training pixels. Training pixels may be selected based on the negative pixel phase signal and/or information from the touch sensor. In some embodiments, the touch sensor is used to detect touch electrodes currently being touched by the user that may be experiencing cross-coupling of the signal but which do not currently share a column or row sense line with the active stylus.

Figure 9:
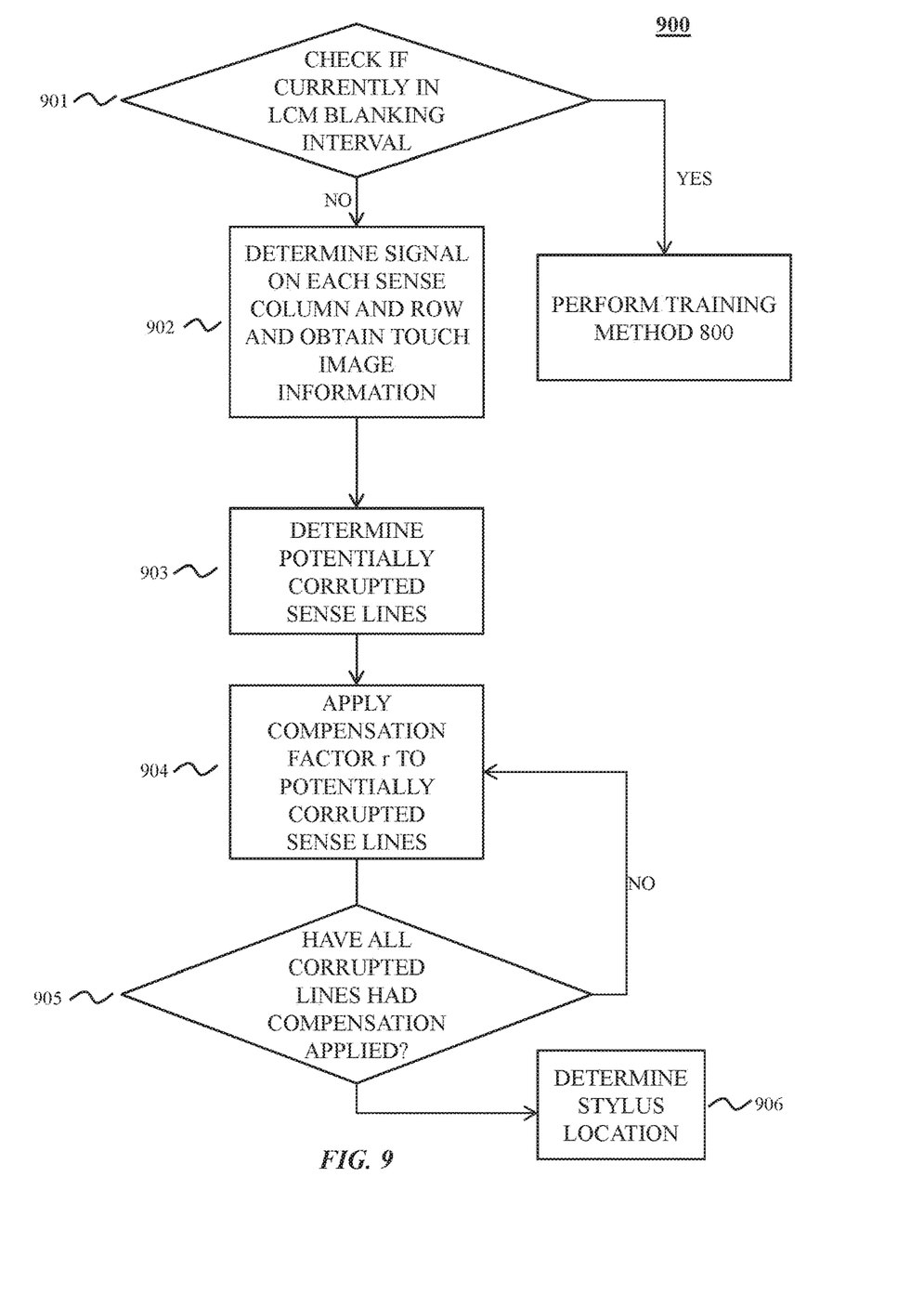
FIG. 9 illustrates a method of cross-coupling mitigation according to some embodiments of the present disclosure.

In step 703, it is determined if the display is currently in a blanking interval. In some embodiments, the display is a liquid crystal display (LCD) and the blanking interval is a liquid crystal display module (LCM) blanking interval. As described in U.S. Pat. No. 8,890,854, incorporated herein in its entirety, touch displays can synchronize scanning of the touch sensor and LCD refresh so that the touch sensor is scanned when the LCD is not being refreshed (the "LCM blanking interval"), by which technique noise generated by the LCD display is minimized during touch scanning. If the LCD is currently in an LCM blanking interval, training continues in step 704. If the LCD is not currently in an LCM blanking interval, the mitigation method according to some embodiments, as shown in FIG. 9, may be triggered instead.

In step 704, an estimate of a compensation factor is determined. This determination process is shown in more detail in FIG. 8.

Figure 8:
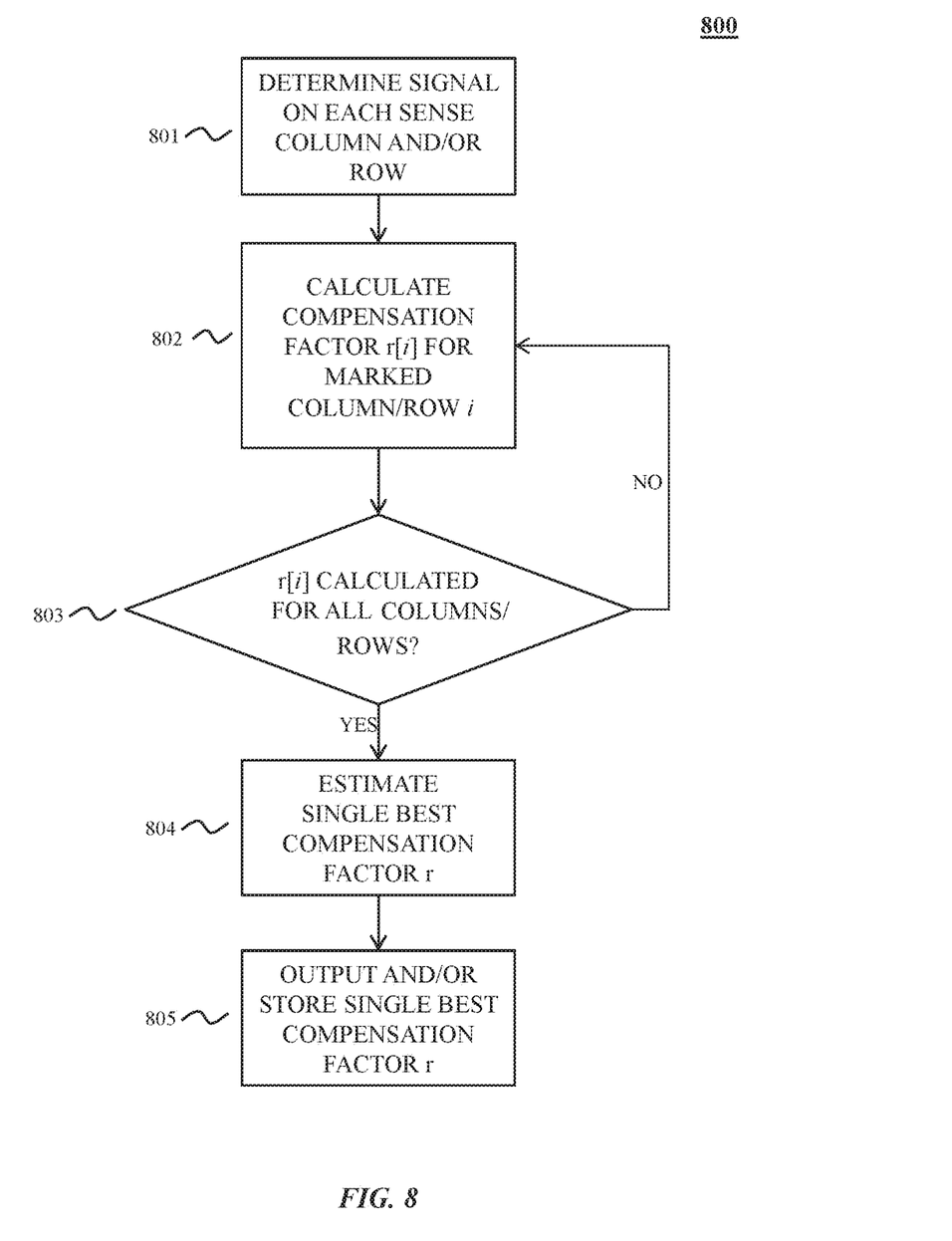
FIG. 8 illustrates details of a method of determining compensation factors for cross-coupling mitigation training according to some embodiments of the present disclosure.

FIG. 8 illustrates details of a method 800 of determining compensation factors for cross-coupling mitigation training according to some embodiments of the present disclosure. In step 801, the signal on each sense column and/or row is determined.

In step 802, for column/row i out of a set of columns/rows 1 to n marked as training pixels, a compensation factor r is calculated. In order to calculate this estimation, Equation 1 is used.

$$V_{pixel}[i] - r[i] \cdot f_{touch}[i] = 0 \quad \text{(Eq. 1)}$$

In Equation 1, $V_{pixel}[i]$ is the measured value for the electrode i. r[i] is the compensation factor to be determined for electrode i. $f_{touch}[i]$ is the touch image information at electrode i. This calculation is performed either with respect to magnitude/phase vectors, or in the I/Q domain. r[i] is calculated such that the left side of the equation becomes zero. r[i] may represent either a magnitude/phase correction factor or a correction factor in the I/Q domain, i.e., r[i] may be represented as $r_{mag}[i]$ and $r_{phase}[i]$ or as $r_i[i]$ and $r_q[i]$.

In step 803, it is determined if there are additional columns/rows marked as training pixels for which r[i] has not yet been calculated. If yes, step 802 is repeated for each such electrode in turn. If no, the method proceeds to step 804.

In step 804, a single best compensation factor r is estimated. To estimate r, a fit across the set of all r[i] for i from 1 to n is used. For example, in some embodiments according to the present disclosure, a least squares fit is used to determine the best compensation factor r based on all r[i]. In other embodiments, other fitting techniques may be used to produce a best compensation factor, such as a linear fit.

In step 805, the best compensation factor r may be output or stored for future use by a cross-coupling mitigation method such as the method described in FIG. 9. Optionally, after step 805, correction of the stylus signal may proceed according to the method described in FIG. 9.

FIG. 9 illustrates a method of cross-coupling mitigation according to some embodiments of the present disclosure. In step 901, it is determined if the system is currently in an LCM blanking interval. If the system is currently in an LCM blanking interval, a training method 800 as described in FIG. 8 may occur. In embodiments in which FIG. 9 is triggered from the method of FIG. 7, step 901 and step 703 may be the same step (i.e., only a single detection of an LCM blanking interval need be performed.)

If the system is not currently in an LCM blanking interval, then the stylus signal may be measured and corrected. In step 902, the signal on each sense column and/or row is determined and touch image information is retrieved from the touch sensor.

In step 903, based on the touch image information, it is determined whether a given sense row or column may be corrupted by cross-coupling through the touch contact. If stylus signal is found on the same sense row or column as a touch contact is found in the touch image information, then that sense row or column may be marked as corrupted.

In step 904, for a sense row or column i that has been marked as corrupted out of a group of sense rows or columns 1 to n that have been marked as corrupted, a correction is applied. In order to correct the measured signal, the trained compensation factor r is used in Equation 2:

$$V_{corrected}[i] = V_{pixel}[i] - r \cdot f_{touch}[i] \quad \text{(Eq. 2)}$$

$V_{corrected}[i]$ represents the corrected value of the stylus signal on the sense row or column. $V_{pixel}[i]$ represents the uncorrected value measured on that row or column. $f_{touch}[i]$ represents a function of the touch image information measured by the touch sensor.

In step 905, if additional rows or columns have been marked as corrupted but not yet had correction applied, the method returns to step 904 to correct another sense line. If all rows or columns marked as corrupted have had correction applied, then the corrected stylus signals may be used to determine stylus location in a step 906 as described in the patents incorporated by reference. By employing the corrected value on each sense line, cross-coupling effects can be mitigated.

Figure 10A:
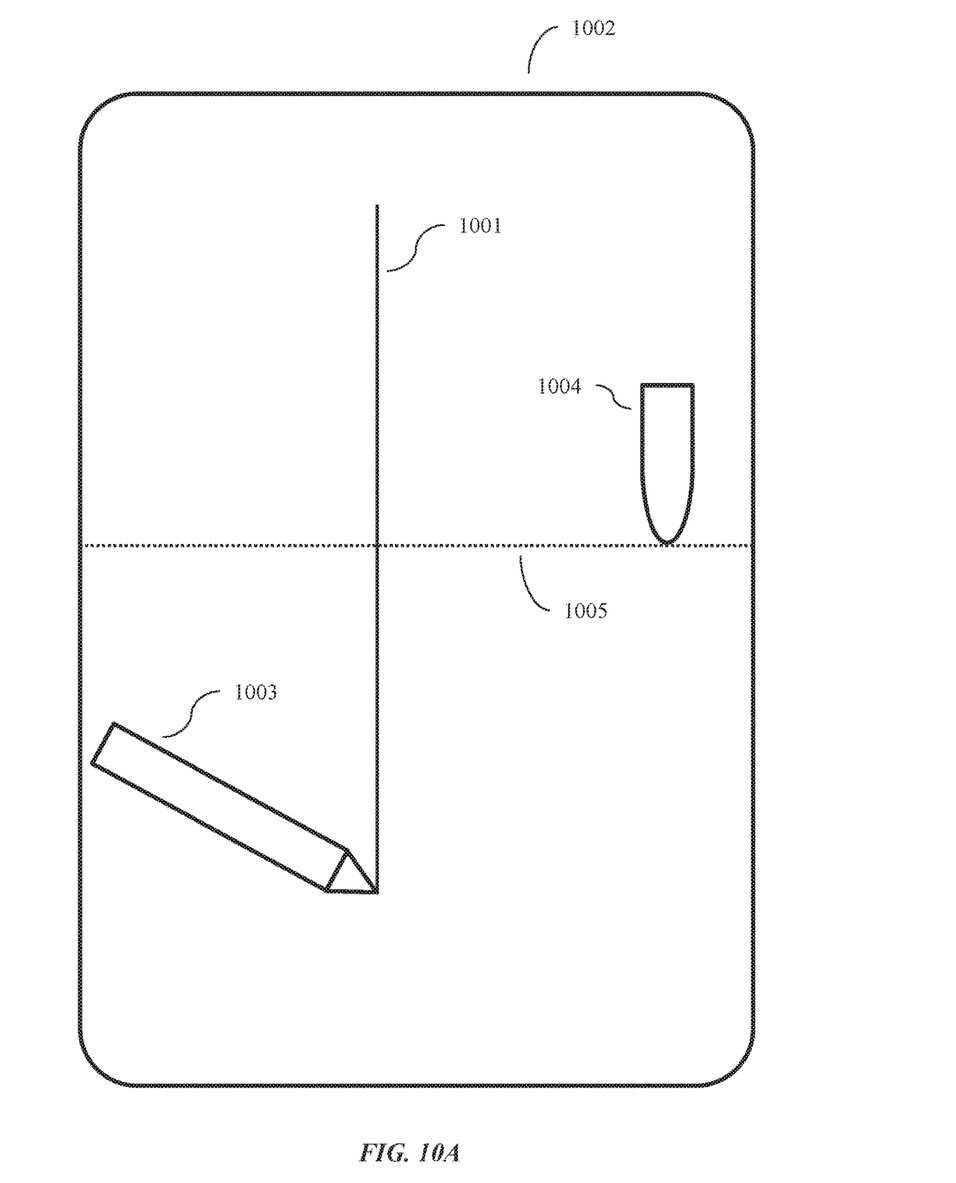
FIGS. 10A-10B illustrate exemplary results of cross-coupling when an active stylus is used in the same way as in FIGS. 6A-6B in a system with cross-coupling mitigation.
Figure 10B:
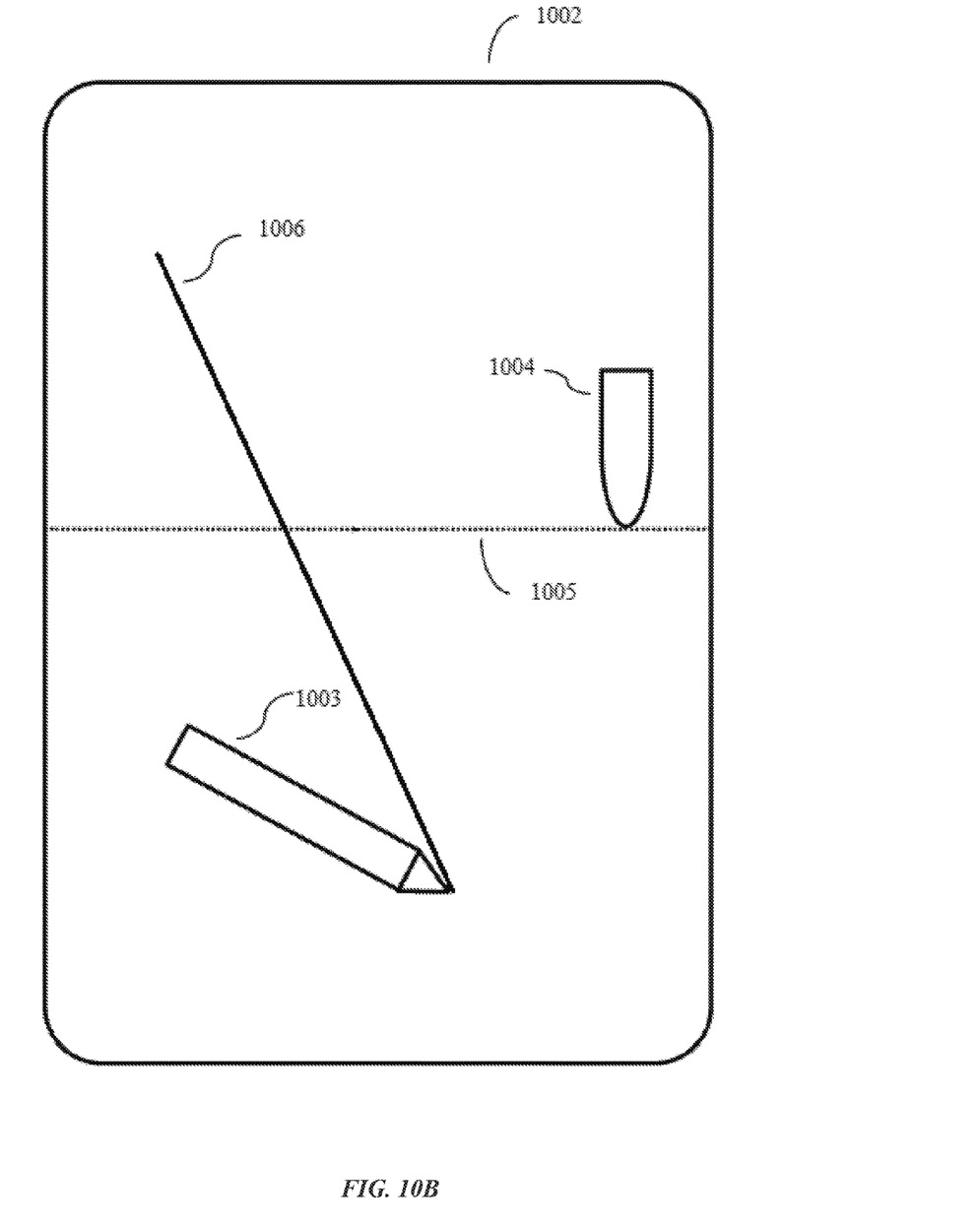

FIGS. 10A-10B illustrate exemplary results of cross-coupling when an active stylus is used in the same way as in FIGS. 6A-6B in a system with cross-coupling mitigation. As in FIGS. 6A-6B, the stylus user has attempted to draw a straight vertical line 1001 and a diagonal line 1006 from top to bottom of the touch screen 1002 using stylus 1003. However, unlike in FIGS. 6A-6B, even though the user has placed finger 1004 on the touch screen, resulting in cross-coupling of the stylus signal, the stylus location is not corrupted. As the stylus tip 1003 passes over the same sense row 1005 as the sense row upon which the user's finger 1004 is placed, the signals interfere, but the mitigation method according to some embodiments of the disclosure described above is applied. This mitigation method prevents or reduces the sideways jump in the line drawn by the stylus as the stylus crosses over the sense row the finger is placed upon.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes.

What is claimed is:

1. A method for mitigating cross-coupling in a device configured to receive input from an active stylus, comprising:

determining, during an LCD module blanking interval of a touch screen display of the device, a best compensation factor by a processor circuit based on measurements taken from one or more of a plurality of sense lines of the device and first touch image information determined by a touch sensor of the device;

determining, by the processor circuit of the device, one or more corrupted sense lines in the touch sensor based on touch image information;

measuring, by the processor circuit, a sense signal on each of the plurality of sense lines;

applying, by the processor circuit, the best compensation factor to the measured sense signal on each of the one or more corrupted sense lines to produce a corrected sense signal for each of the one or more corrupted sense lines;

determining, by the processor circuit, a stylus location based on the corrected sense signals, the stylus location being different from a detected stylus location detected by the touch sensor before applying the best compensation factor; and generating, by the processor circuit, a stylus input made at the stylus location.

2. The method of claim 1, wherein the training comprises:
marking, by the processor circuit, a plurality of sense lines as training pixels;
  measuring, by the processor circuit, a training sense signal on each of the training pixels;
  calculating, by the processor circuit, a plurality of compensation factors, wherein each of the plurality of compensation factors is a best compensation factor for one of the training pixels; and
  computing, by the processor circuit, the best compensation factor from the plurality of compensation factors.

3. The method of claim 2, wherein each of the plurality of compensation factors is calculated by the processor circuit such that a dot product of the compensation factor and the touch image information for the training pixel equals the measured training sense signal on the training pixel.

4. The method of claim 3, wherein the processor circuit uses a least squares fit to calculate each of the plurality of compensation factors.

5. The method of claim 3, wherein the processor circuit uses a linear fit to calculate each of the plurality of compensation factors.

6. The method of claim 2, wherein the processor circuit marks a sense line as a training pixel when a negative phase of the active stylus signal is present on the sense line and a touch contact is present on the sense line.

7. The method of claim 1, wherein the best compensation factor comprises a magnitude portion and a phase portion.

8. The method of claim 1, wherein the corrected sense signal is equal to a difference between the measured sense signal for each of the one or more corrupted sense lines and a dot product of the best compensation factor and the touch image information for each of the one or more corrupted sense lines.

9. The method of claim 1, wherein the active stylus generates a plurality of stylus drive signals.

10. The method of claim 9, wherein the plurality of stylus drive signals comprise a ring drive signal and a tip drive signal.

11. A system for mitigating cross-coupling comprising:
an active stylus;
a touch screen display comprising a touch sensor with a plurality of sense lines;
a memory storing program instructions; and
a processor circuit coupled to the memory and configured to execute the program instructions causing the processor circuit to:
  determine, during a LCD module blanking interval of the touch screen display, a best compensation factor based on measurements taken from one or more of the plurality of sense lines and first touch image information determined by the touch sensor;
  determine one or more corrupted sense lines based on second touch image information determined by the touch sensor;
  measure a sense signal on each of the plurality of sense lines;
  apply the best compensation factor to the measured sense signal on each of the one or more corrupted sense lines to produce a corrected sense signal for each of the one or more corrupted sense lines;
  determine a stylus location based on the corrected sense signals, the stylus location being different from a detected stylus location detected by the touch sensor before applying the best compensation factor; and
  generate a stylus input made at the stylus location.

12. The system of claim 11, wherein the program instructions further cause the processor circuit to:
mark a plurality of sensed lines as training pixels;
measure a training sense signal on each of the training pixels;
calculate a plurality of compensation factors, wherein each compensation factor is a best compensation factor for one of the training pixels; and
compute the best compensation factor from the plurality of compensation factors.

13. The system of claim 12, wherein the program instructions further cause the processor circuit to calculate each of the plurality of compensation factors such that a dot product of the compensation factor and the second touch image information for the training pixel equals the measured training sense signal on the training pixel.

14. The system of claim 13, wherein the program instructions further cause the processor circuit to use a least square fit to calculate each of the plurality of compensation factors.

15. The system of claim 13, wherein the program instructions further cause the processor circuit to use a linear fit to calculate each of the plurality of compensation factors.

16. The system of claim 12, wherein the program instructions further cause the processor circuit to mark a sense line as a training pixel when a negative phase of the active stylus signal is present on the sense line and a touch contact is present on the sense line.

17. The system of claim 11, wherein the best compensation factor comprises a magnitude portion and a phase portion.

18. The system of claim 11, wherein the corrected sense signal is equal to a difference between the measured sense signal for each of the one or more corrupted sense lines and a dot product of the best compensation factor and the second touch image information for each of the one or more corrupted sense lines.

19. The system of claim 11, wherein the active stylus generates a plurality of stylus drive signals.

20. The system of claim 19, wherein the plurality of stylus drive signals comprise a ring drive signal and a tip drive signal.

21. A touch-screen device comprising the system of claim 11.

* * * * *